United States Patent
Shirakawa

(10) Patent No.: US 8,682,031 B2
(45) Date of Patent: Mar. 25, 2014

(54) IMAGE PROCESSING DEVICE, CAMERA, IMAGE PROCESSING METHOD, AND PROGRAM

(75) Inventor: Hirotsugu Shirakawa, Tokyo (JP)

(73) Assignee: NEC Corporation, Tokyo (JP)

(*) Notice: Subject to any disclaimer, the term of this patent is extended or adjusted under 35 U.S.C. 154(b) by 554 days.

(21) Appl. No.: 12/937,019

(22) PCT Filed: Apr. 21, 2009

(86) PCT No.: PCT/JP2009/058224
§ 371 (c)(1),
(2), (4) Date: Oct. 8, 2010

(87) PCT Pub. No.: WO2009/142098
PCT Pub. Date: Nov. 26, 2009

(65) Prior Publication Data
US 2011/0038549 A1 Feb. 17, 2011

(30) Foreign Application Priority Data
Apr. 23, 2008 (JP) .................................. 2008-112813

(51) Int. Cl.
*G06K 9/00* (2006.01)
(52) U.S. Cl.
USPC .......................................... 382/103; 382/209
(58) Field of Classification Search
USPC .......................................... 382/100, 103, 209
See application file for complete search history.

(56) References Cited

U.S. PATENT DOCUMENTS

| | | | |
|---|---|---|---|
| 5,802,494 A * | 9/1998 | Kuno | 705/2 |
| 7,039,221 B1 * | 5/2006 | Tumey et al. | 382/118 |
| 7,340,100 B2 * | 3/2008 | Higaki et al. | 382/199 |
| 7,693,310 B2 * | 4/2010 | Kato et al. | 382/118 |
| 2009/0022369 A1 * | 1/2009 | Satoh et al. | 382/106 |

FOREIGN PATENT DOCUMENTS

| | | |
|---|---|---|
| JP | 5-334411 A | 12/1993 |
| JP | 2003274320 A | 9/2003 |
| JP | 2006-72495 A | 3/2006 |
| JP | 2006101186 A | 4/2006 |
| JP | 2006293912 A | 10/2006 |
| JP | 2007068147 A | 3/2007 |
| JP | 2007-213170 A | 8/2007 |
| WO | 2008/041629 A1 | 4/2008 |

OTHER PUBLICATIONS

International Search Report for PCT/JP2009/058224 mailed May 26, 2009.
Japanese Office Action for JP 2010-512983 mailed on Jun. 11, 2013 with Partial English Translation.
Japanese Office Action for JP Application No. 2010-512983 mailed on Dec. 3, 2013 with partial English Translation.

* cited by examiner

*Primary Examiner* — Shefali Goradia
(74) *Attorney, Agent, or Firm* — Sughrue Mion, PLLC

(57) ABSTRACT

The present invention enables the detecting and tracking of a specific subject using a simple structure and simplified operations without registering characteristic information of the subject. The invention comprises: a subject detection means that detects a subject image from an image; a subject-recognition-information storage means that stores a recognition ID of the subject image as well as a first position that is the position at which the subject image was last detected within the image; and a recognition ID assigning means that assigns the recognition ID to the subject image, wherein if the first position is within a predefined distance from the position at which the subject detection means detects the subject image, the recognition ID assigning means assigns the recognition ID corresponding to the first position to the subject image.

11 Claims, 20 Drawing Sheets

| RECOGNITION ID | POSITION COORDINATES | DETECTION FLAG | TRACKING TARGET FLAG |
|---|---|---|---|
| 1 | $(X_{11}, Y_{11}), (X_{12}, Y_{12})$ | Y | Y |
| 2 | $(X_{21}, Y_{21}), (X_{22}, Y_{22})$ | Y | |
| 3 | $(X_{31}, Y_{31}), (X_{32}, Y_{32})$ | Y | |
| : | : | : | : |

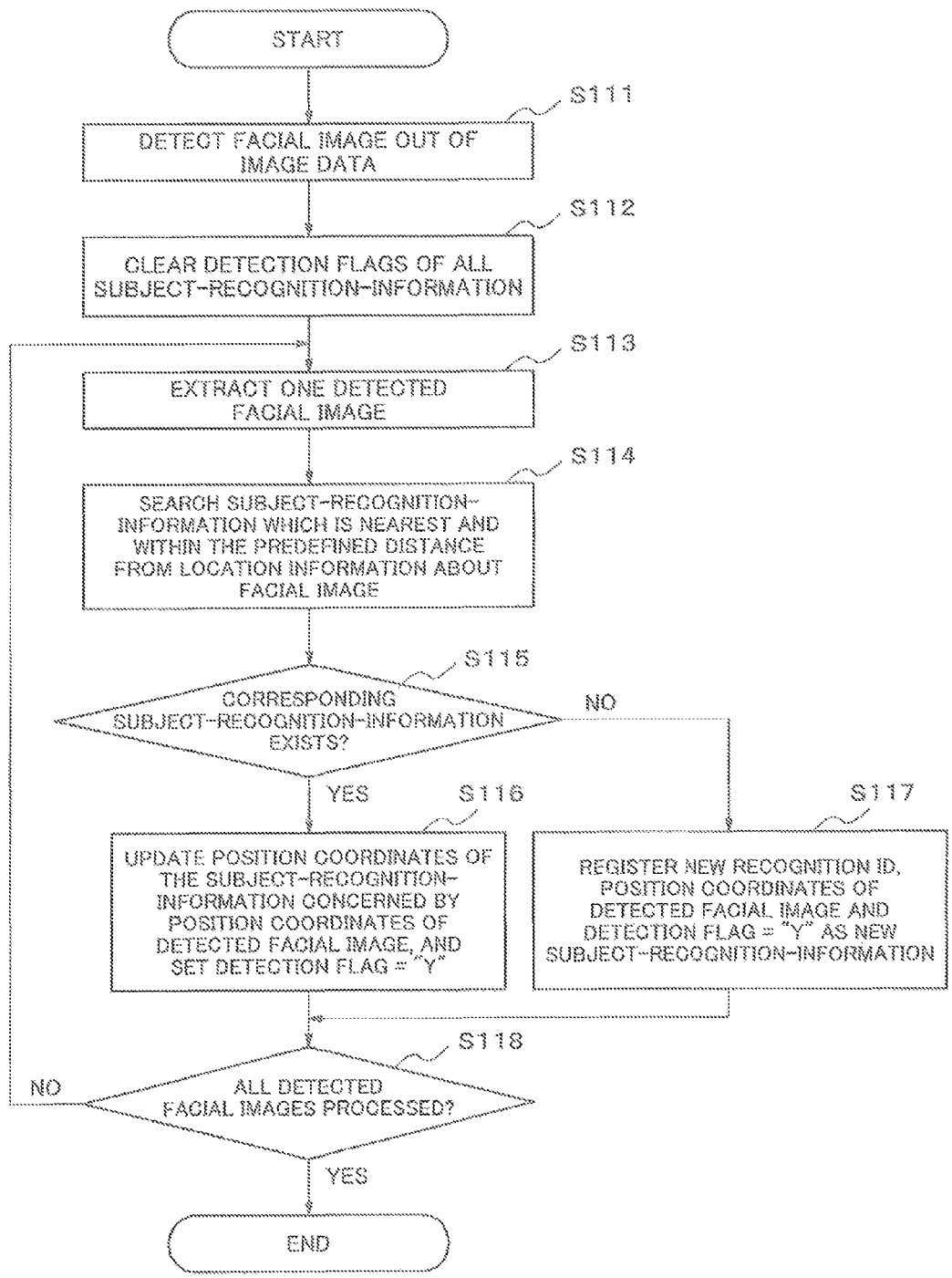

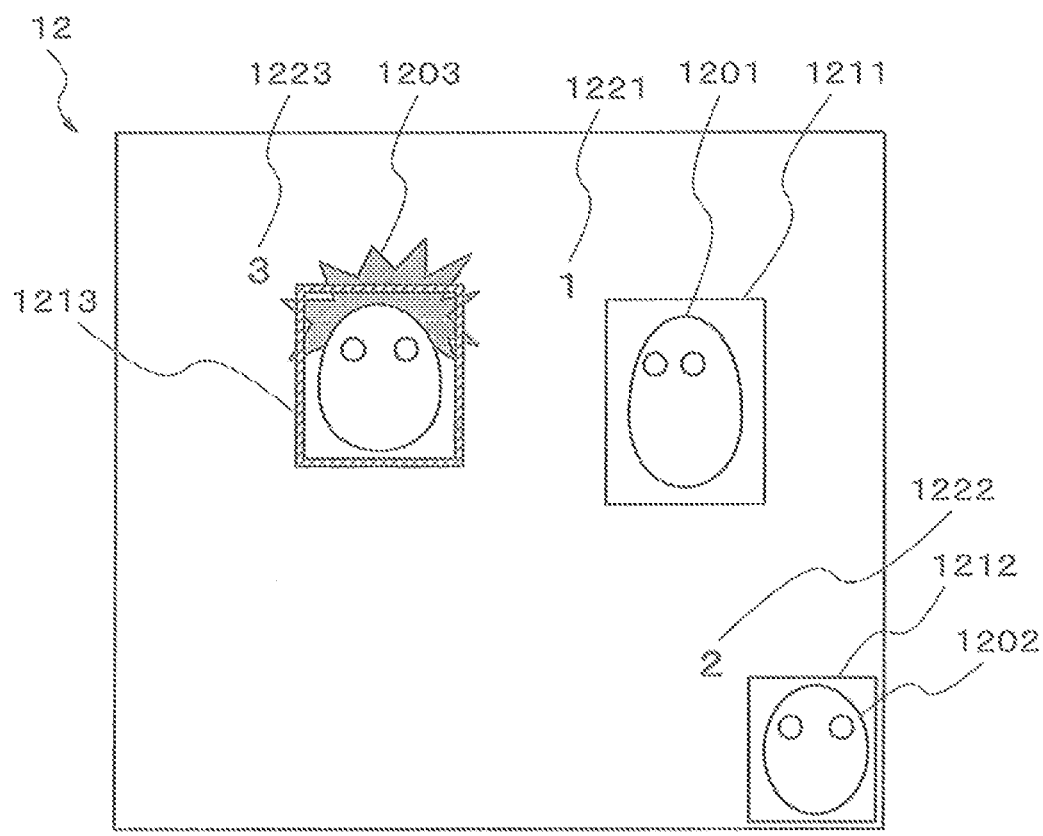

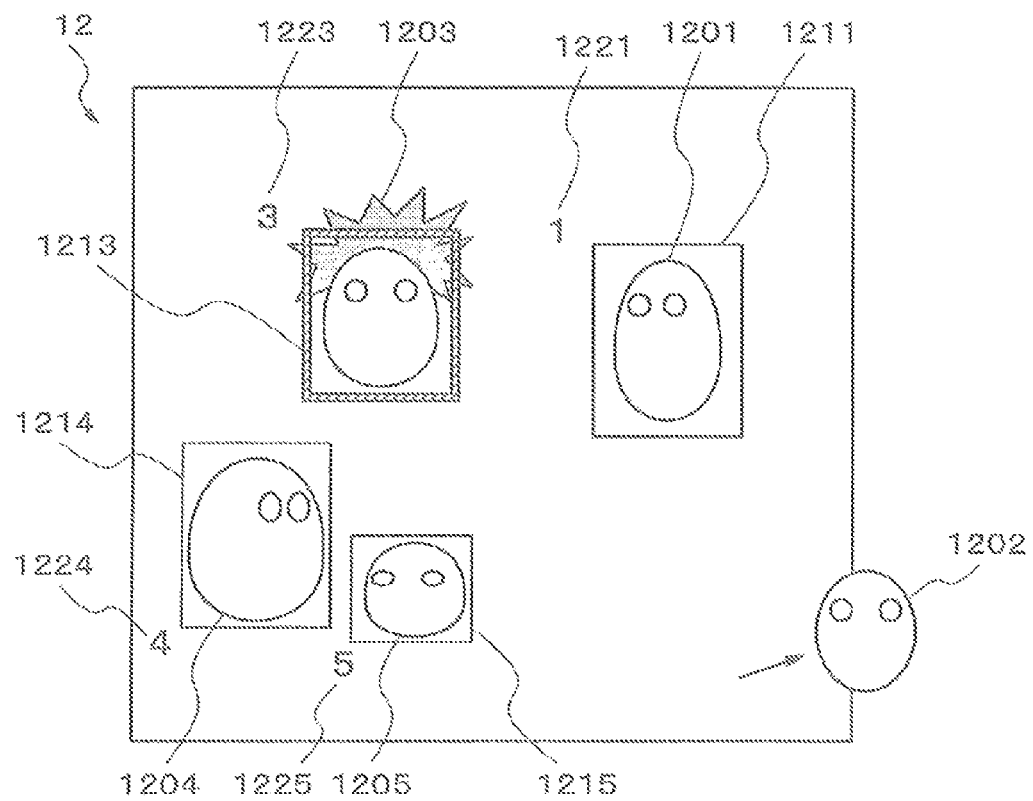

| RECOGNITION ID | POSITION COORDINATES | DETECTION FLAG | TRACKING TARGET FLAG |
|---|---|---|---|
| 1 | $(X_{11}, Y_{11}), (X_{12}, Y_{12})$ | Y | |
| 2 | $(X_{21}, Y_{21}), (X_{22}, Y_{22})$ | | |
| 3 | $(X_{31}, Y_{31}), (X_{32}, Y_{32})$ | Y | Y |
| 4 | $(X_{41}, Y_{41}), (X_{42}, Y_{42})$ | Y | |
| 5 | $(X_{51}, Y_{51}), (X_{52}, Y_{52})$ | Y | |
| | | | |

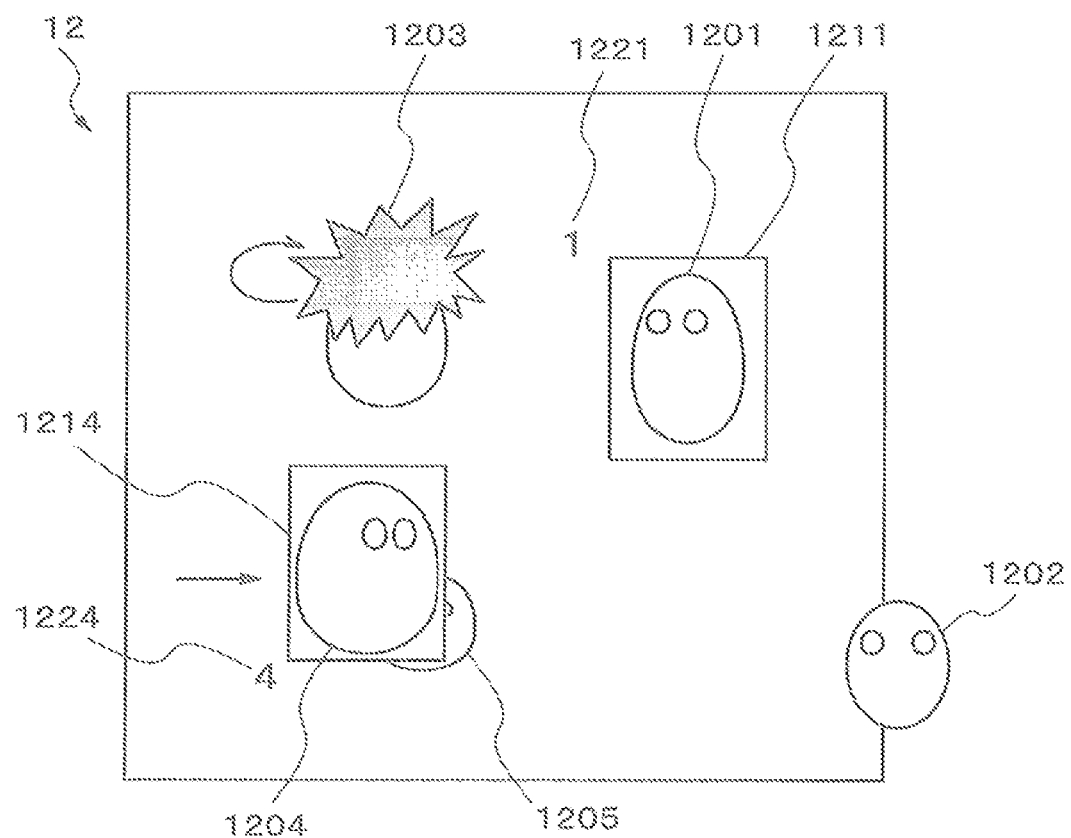

103

| RECOGNITION ID | POSITION COORDINATES | DETECTION FLAG | TRACKING TARGET FLAG |
|---|---|---|---|
| 1 | $(X_{11}, Y_{11}), (X_{12}, Y_{12})$ | Y | |
| 2 | $(X_{21}, Y_{21}), (X_{22}, Y_{22})$ | | |
| 3 | $(X_{31}, Y_{31}), (X_{32}, Y_{32})$ | | Y |
| 4 | $(X'_{41}, Y'_{41}), (X'_{42}, Y'_{42})$ | Y | |
| 5 | $(X_{51}, Y_{51}), (X_{52}, Y_{52})$ | | |
| | | | |

| RECOGNITION ID | POSITION COORDINATES | DETECTION FLAG | TRACKING TARGET FLAG |
|---|---|---|---|
| 1 | $(X_{11}, Y_{11}), (X_{12}, Y_{12})$ | Y | |
| 2 | $(X'_{21}, Y'_{21}), (X'_{22}, Y'_{22})$ | Y | |
| 3 | $(X_{31}, Y_{31}), (X_{32}, Y_{32})$ | | Y |
| 4 | $(X''_{41}, Y''_{41}), (X''_{42}, Y''_{42})$ | Y | |
| 5 | $(X_{51}, Y_{51}), (X_{52}, Y_{52})$ | Y | |
| | | | |

| RECOGNITION ID | POSITION COORDINATES | DETECTION FLAG | TRACKING TARGET FLAG |
|---|---|---|---|
| 1 | $(X_{11}, Y_{11}), (X_{12}, Y_{12})$ | Y | |
| 2 | $(X'_{21}, Y'_{21}), (X'_{22}, Y'_{22})$ | Y | |
| 3 | $(X_{31}, Y_{31}), (X_{32}, Y_{32})$ | Y | Y |
| 4 | $(X''_{41}, Y''_{41}), (X''_{42}, Y''_{42})$ | Y | |
| 5 | $(X_{51}, Y_{51}), (X_{52}, Y_{52})$ | Y | |
| | | | |

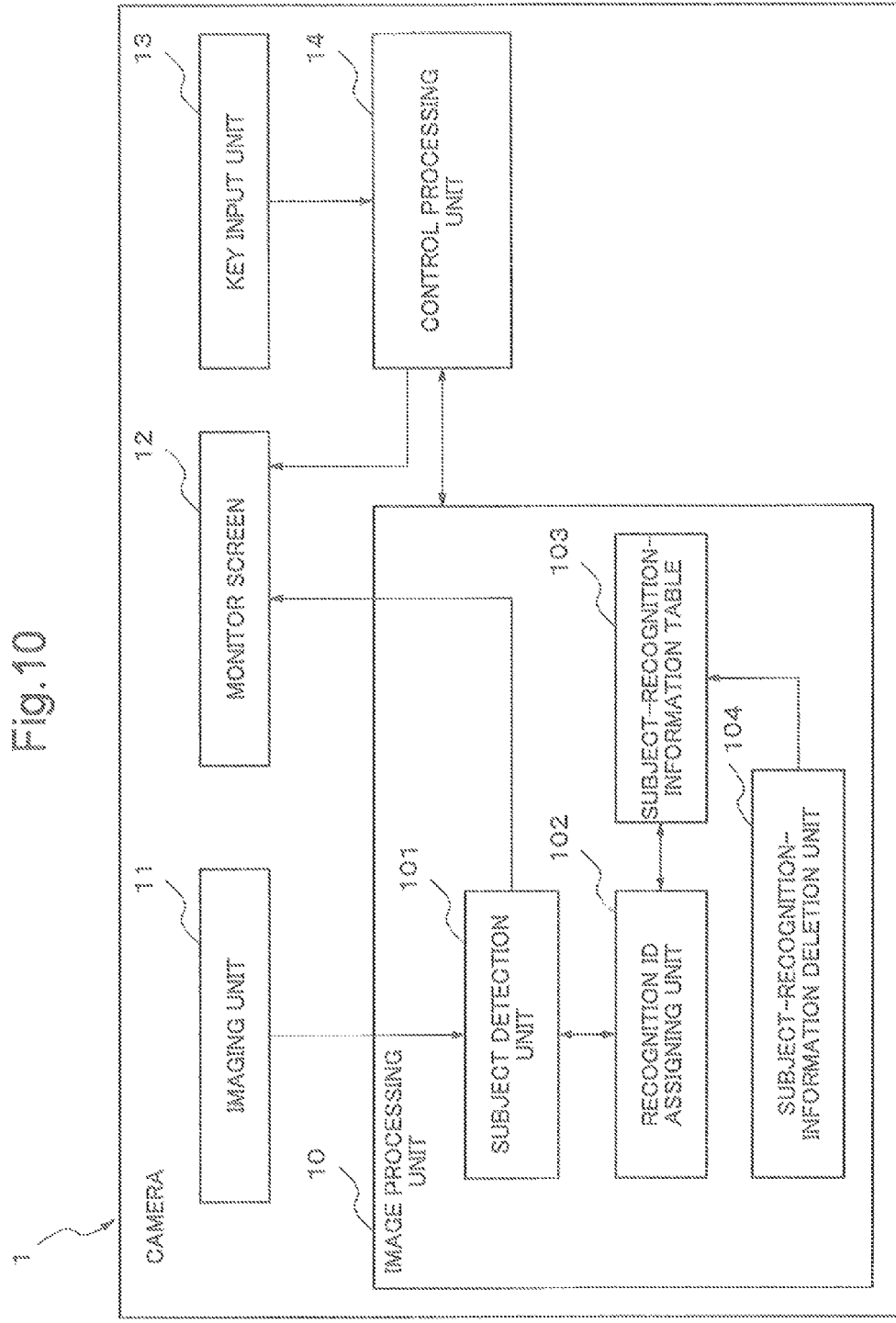

Fig.11

| RECOGNITION ID | POSITION COORDINATES | DETECTION FLAG | TRACKING TARGET FLAG | DETECTED TIME |
|---|---|---|---|---|
| 1 | $(X_{11}, Y_{11}), (X_{12}, Y_{12})$ | Y | Y | $t_1$ |
| 2 | $(X_{21}, Y_{21}), (X_{22}, Y_{22})$ | Y | | $t_2$ |
| 3 | $(X_{31}, Y_{31}), (X_{32}, Y_{32})$ | Y | | $t_3$ |
| ... | ... | ... | ... | ... |

103

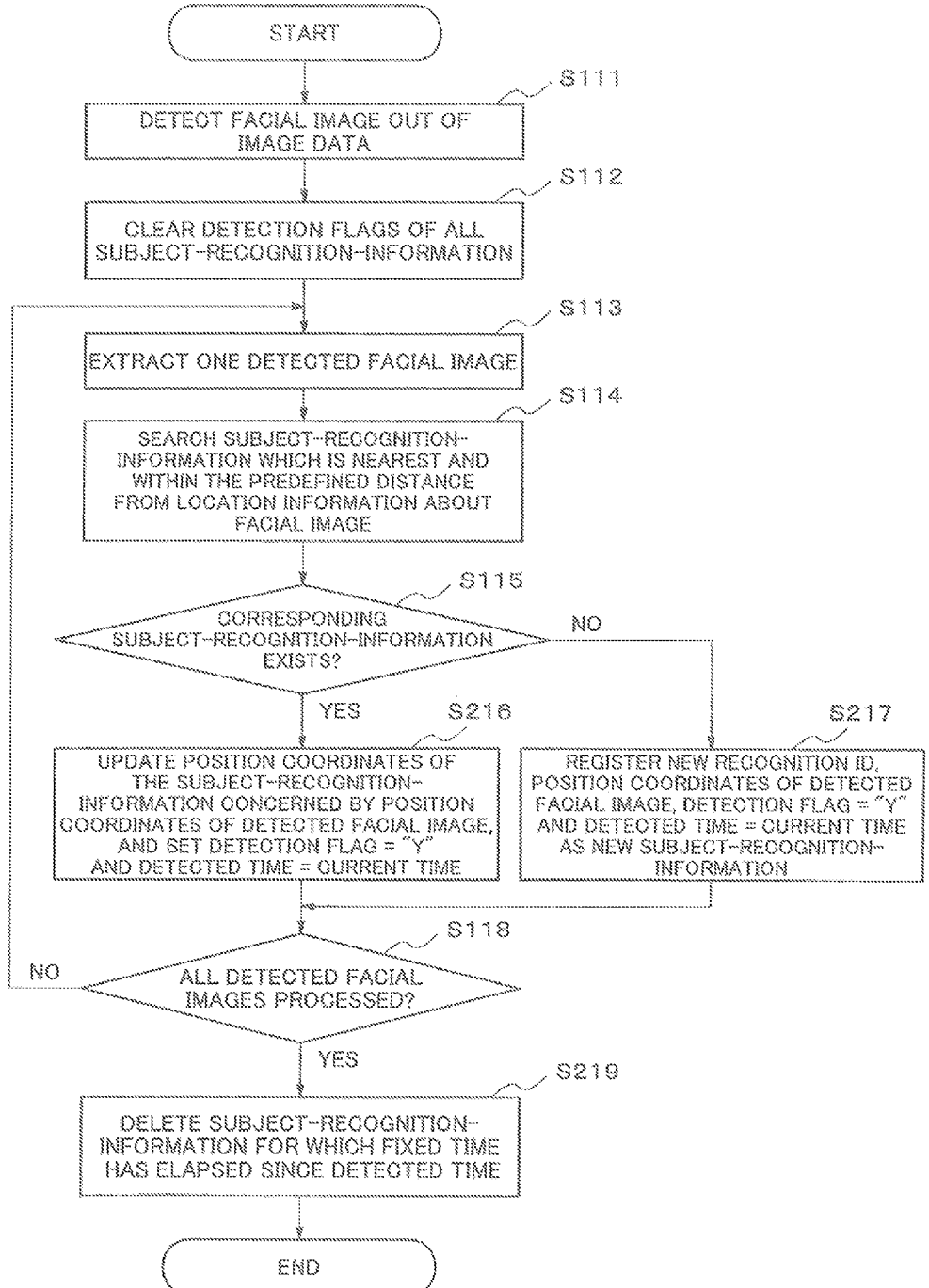

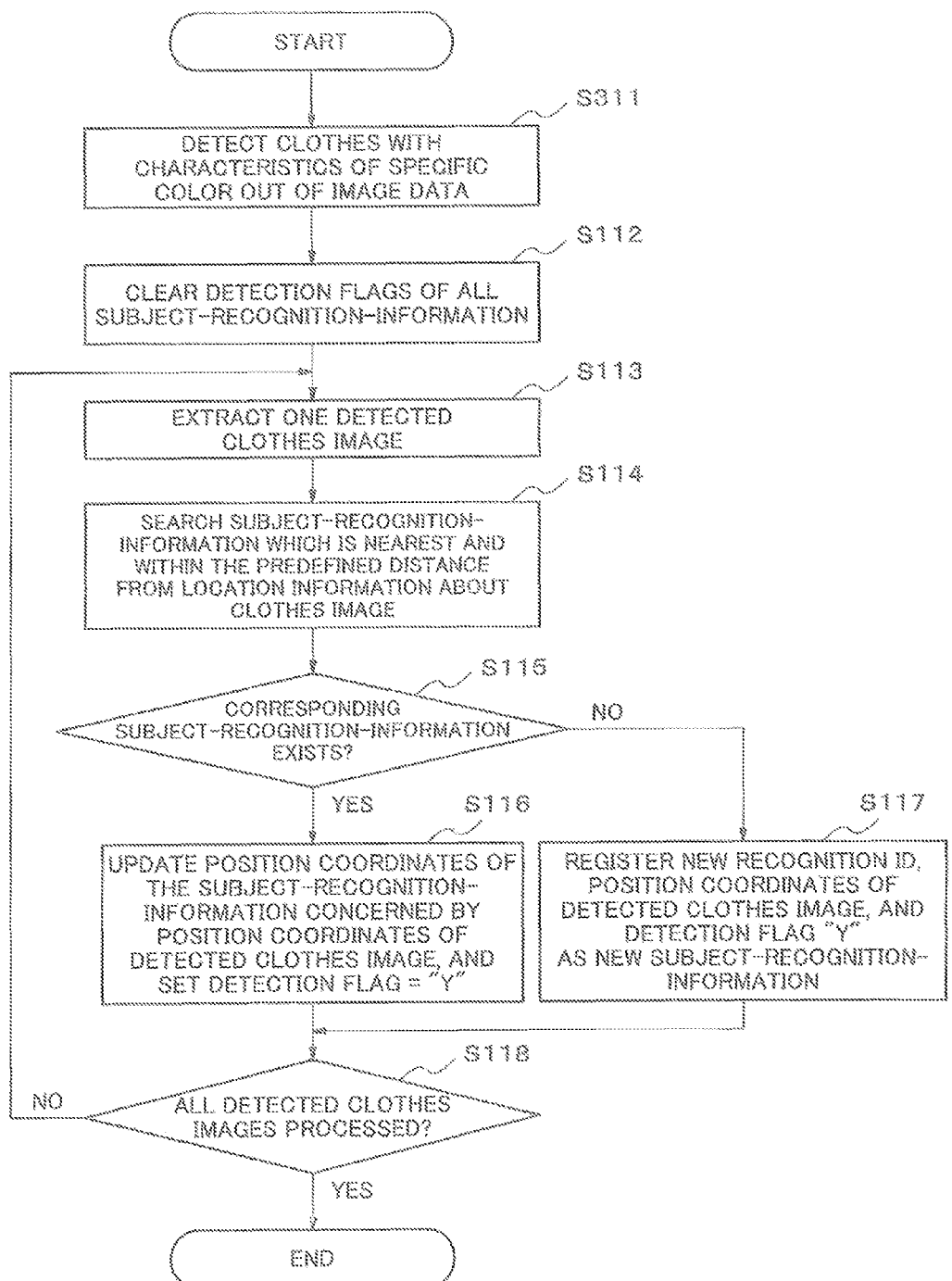

| RECOGNITION ID | POSITION COORDINATES | DETECTION FLAG | TRACKING TARGET FLAG |
|---|---|---|---|
| 6 | $(X_{61}, Y_{61})$, $(X_{62}, Y_{62})$ | Y | Y |
| 7 | $(X_{71}, Y_{71})$, $(X_{72}, Y_{72})$ | Y | |
| | | | |
| | | | |
| | | | |
| | | | |

IMAGE PROCESSING DEVICE, CAMERA, IMAGE PROCESSING METHOD, AND PROGRAM

This application is the National Phase of PCT/JP2009/058224, filed Apr. 21, 2009, which is based upon and claims the benefit of priority from Japanese Patent Application No. 2008-112813, filed on Apr. 23, 2008, the disclosure of which is incorporated herein in its entirety by reference.

TECHNICAL FIELD

The present invention relates to an image processing device, a camera, an image processing method and a program which can detect and track a specific subject.

BACKGROUND ART

A face of a person is a main subject of a digital still camera (hereafter referred to as "a camera") and a digital video camera. Therefore, when photographing, a technology which detects a face of a person and performs automatic focusing control or automatic exposure control suitable for the face of the person was desired:

Further, in actual photographing, in addition to a face of a person who is to be photographed, other faces of persons are also photographed simultaneously. For this reason, a technology which detects and tracks only a specific face among a plurality of faces was also desired.

Patent document 1 discloses a technology which detects and tracks only a registered subject by registering characteristic information about an image of a specific part of the subject such as a face in advance, and by comparing this information and a screen image on a monitor.

Patent document 2 discloses a technology in which a mobile phone extracts a facial image of a person from a motion picture which is being photographed and transmits it to a server; and the server compares it with facial images registered in advance, transmits proper information about a person corresponding to the facial image which agreed in the comparison to the mobile phone and make it displayed.

Patent document 1: Japanese Patent Application Laid-Open No. 2006-101186

Patent document 2: Japanese Patent Application Laid-Open No. 2006-293912

Patent document 3: Japanese Patent Application Laid-Open No. 1993-334411

DISCLOSURE OF THE INVENTION

Technical Problem

However, the technology disclosed by patent document 1 has the following problems.

(1) Because a means to store subject's characteristic information is needed, the structure of the camera becomes complicated. For this reason, the production cost of the camera increases.

(2) Because a user needs to register subject's characteristic information in advance, an operational procedure of the camera becomes complicated. For this reason, user's burden increases.

Further, the technology disclosed by patent document 2 has the following problems.

(3) Because the server storing the subject's facial images is needed, the introduction and operation cost of the server arise. For this reason, the introduction and operation cost of the system increase.

(4) Because image data needs to be sent and received, the communication cost arises. For this reason, the operation cost of the system increase.

The object of the present invention is to provide an image processing device, a camera, an image processing method and a program which settle problems mentioned above.

Technical Solution

An image processing device according to an exemplary aspect of the present invention includes:

subject detection means for detecting a subject image from an image;

subject-recognition-information storage means for storing a recognition ID of the subject image as well as a first position that is the position at which the subject image was last detected within the image; and recognition ID assigning means for assigning the recognition ID to the subject image, wherein if the first position is within a predefined distance from the position at which the subject detection means detected the subject image, the recognition ID assigning means assigns the recognition ID corresponding to the first position to the subject image.

A camera according to an exemplary aspect of the present invention includes:

imaging means for photographing a subject;

the above-mentioned image processing device; and display means which displays an image photographed by the imaging means and information about the subject which the image processing device generates.

An image processing method according to an exemplary aspect of the present invention includes:

storing a recognition ID of a subject image as well as a first position that is the position at which the subject image was last detected within an image;

detecting the subject image from the image; and assigning the recognition ID corresponding to the first position to the subject image if the first position is within a predefined distance from the position at which the subject image was detected.

An image processing program according to an exemplary aspect of the present invention causes a computer execute image processing which is characterized by including:

storing a recognition ID of a subject image as well as a first position that is the position at which the subject image was last detected within an image;

detecting a subject image from the image; and assigning the recognition ID corresponding to the first position to the subject image if the first position is within a predefined distance from the position at which the subject image was detected.

Advantageous Effects

An image processing device, a camera, an image processing method and a program according to the present invention enable the detecting and tracking of a specific subject using a simple structure and simplified operations.

BRIEF DESCRIPTION OF THE DRAWINGS

FIG. 4 is a flow chart illustrating a subject image recognition processing operation in the first exemplary embodiment.

FIG. 5(a) is a figure (part 1) showing an image displayed on a monitor screen just after the subject image recognition processing in the first exemplary embodiment.

FIG. 6(a) is a figure (part 2) showing an image displayed on the monitor screen just after the subject image recognition processing in the first exemplary embodiment

FIG. 7(a) is a figure (part 3) showing an image displayed on the monitor screen just after the subject image recognition processing in the first exemplary embodiment

FIG. 8(b) is a figure (part 4) showing the contents of the subject-recognition-information table just after the subject image recognition processing in the first exemplary embodiment.

FIG. 10 is a block diagram showing a functional structure of the whole camera according to the second exemplary embodiment.

FIG. 11 is a figure showing an example of information stored in a subject-recognition-information table of FIG. 10.

FIG. 12 is a flow chart illustrating a subject image recognition processing operation in the second exemplary embodiment.

FIG. 13 is a flow chart illustrating a subject image recognition processing operation in the third exemplary embodiment.

FIG. 14(b) is a figure showing the contents of a subject-recognition-information table just after the subject image recognition processing in the third exemplary embodiment.

EXPLANATION OF REFERENCE

Figure 1:
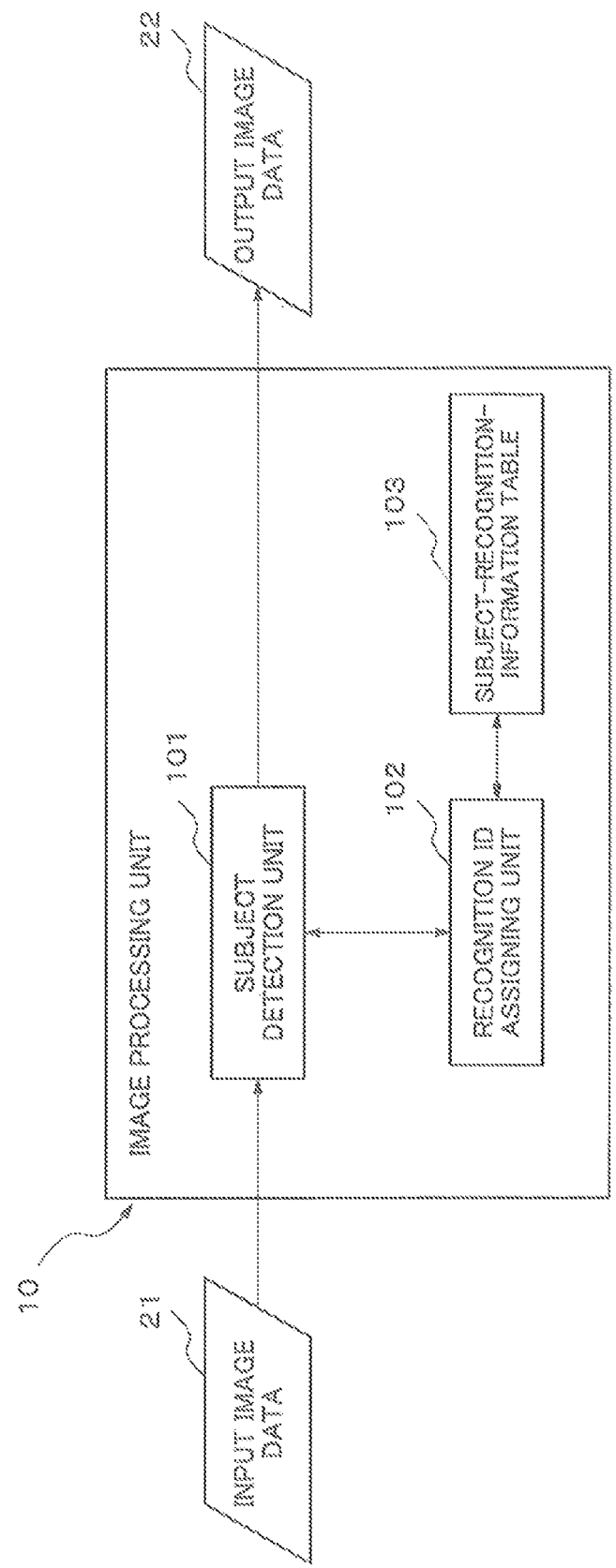
FIG. 1 is a block diagram showing a functional structure of an image processing unit of a camera according to the first exemplary embodiment of the present invention.

1 Camera
10 Image processing unit
101 Subject detection unit
102 Recognition ID assigning unit
103 Subject-recognition-information table
104 Subject-recognition-information deletion unit
11 Imaging unit
12 Monitor screen
13 Key input unit
14 Control processing unit
21 Input image data
22 Output image data

BEST MODE FOR CARRYING OUT THE INVENTION

Next, an exemplary embodiment of the present invention will be described with reference to drawings.

(The First Exemplary Embodiment)

FIG. 1 is a block diagram showing a functional structure of an image processing unit 10 which performs subject's image data processing within a camera according to the first exemplary embodiment of the present invention. The image processing unit 10 includes a subject detection unit 101, a recognition ID (Identification) assigning unit 102 and a subject-recognition-information table 103. The subject-recognition-information table 103 is also called the subject-recognition-information storage unit. The subject detection unit 101 detects subject's image from inputted input image data 21. The subject-recognition-information table 103 stores subject's recognition ID and position coordinates. The recognition ID assigning unit 102 searches for the position coordinates which are within a predefined distance from the position coordinates of the detected subject image in the subject-recognition-information table 103. If corresponding position coordinates exist in the subject-recognition-information table 103, the recognition ID assigning unit 102 assigns the recognition ID corresponding to the position coordinates to the subject image. These components may be structured by hardware or software. Output image data 22 includes information about the subject such as the recognition ID.

Thus, by comparing subject's detected position coordinates and the position coordinates which the subject-recognition-information table 103 stores, the image processing unit 10 always assigns the identical recognition ID to the identical subject. By so doing, the image processing unit 10 enables the detecting and tracking of a specific subject without storing subject's characteristic information.

Figure 2:
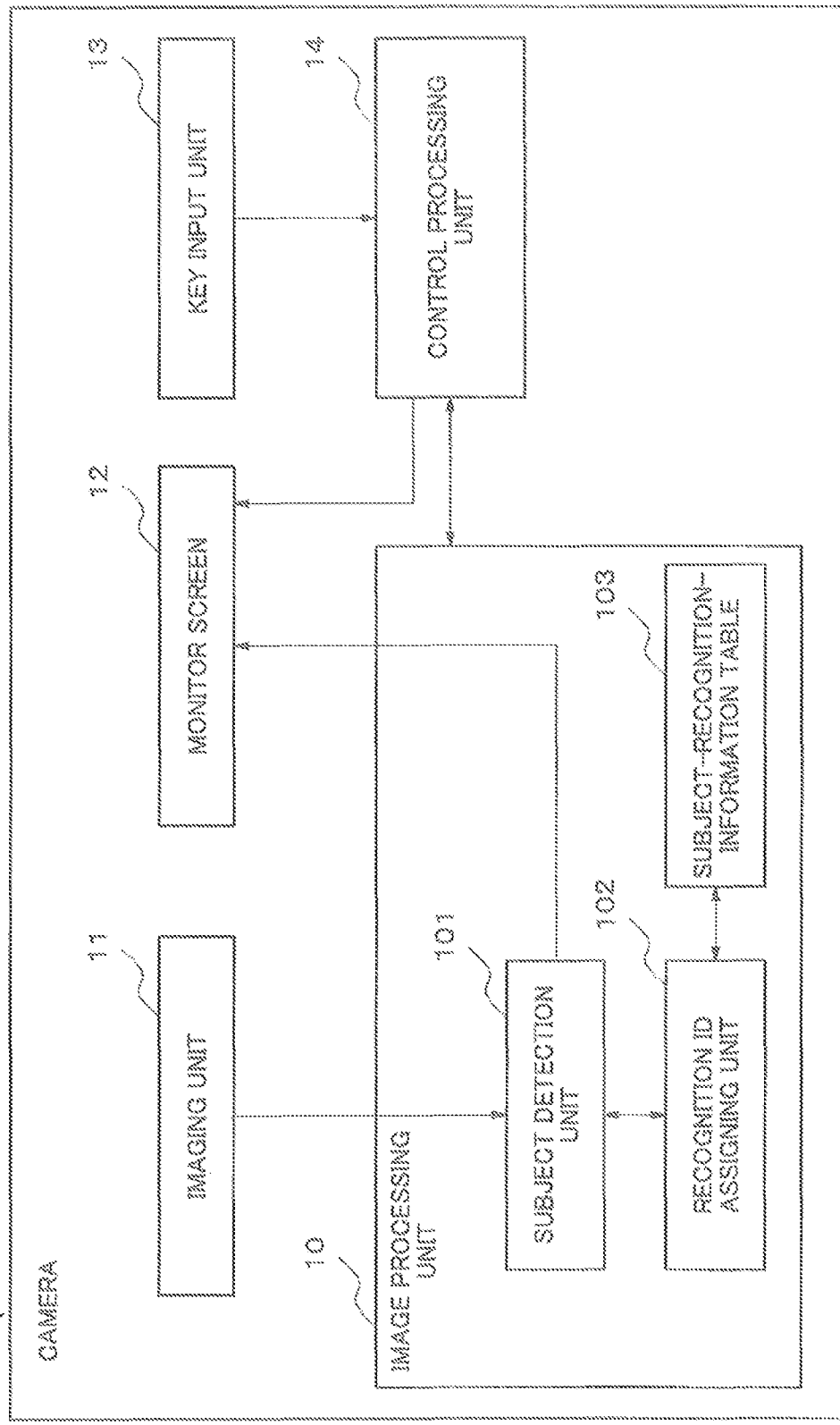
FIG. 2 is a block diagram showing a functional structure of the whole camera according to the first exemplary embodiment.

Next, the whole structure of the camera according to the first exemplary embodiment of the present invention including the image processing unit 10 will be described with reference to FIG. 2. FIG. 2 is a block diagram showing the main functional structure of a camera 1 according to the first exemplary embodiment. An imaging unit 11 includes lens, a focusing device and CCD (charge coupled device) and so on, and photographs a subject and generates image data which is digital data. A monitor screen 12 is a display device such as a liquid crystal display and displays subject's image to be photographed, information about the subject or information about operation of the camera. A key input unit 13 is an input device with which a user sets up the camera 1 or gives directions, and includes such as cursor keys, numeric keys and an enter key. A control processing unit 14 includes a system clock generation device, CPU and so on, and operates the general control of the device. The image processing unit 10 processes image data inputted from the imaging unit 11, and outputs and displays it on the monitor screen 12. Further, because the subject detection unit 101, the recognition ID assigning unit 102 and the subject-recognition-information table 103, which are components of the image processing unit 10, are already described, the description will be omitted.

Figure 3:
FIG. 3 is a figure showing an example of information stored in a subject-recognition-information table of FIGS. 1 and 2.

Here, information stored in the subject-recognition-information table 103 will be described with reference to FIG. 3. The subject-recognition-information table 103 includes, as information at a time of subject image recognition processing execution, a recognition ID, position coordinates last detected, a detection flag which shows whether it is detected and a tracking target flag. This information is called "subject-recognition-information". Position coordinates represent an area which a facial image occupies in image data. This is, for example, like {(Xm, Ym), (Xn, Yn)}, expressed by coordinates of one vertex of a rectangular area and of another vertex located on a diagonal line which passes the vertex. Further, subject image recognition processing is described in the following.

The camera according to the first exemplary embodiment of the present invention detects an image of subject's specific part from input image data and searches for the subject-recognition-information table using the position coordinates of the detected image as a key. And it judges subject-recognition-information whose distance from the detected image is within the predefined distance and which has the closest position coordinates as subject-recognition-information which indicates the image detected. This series of processing is called "subject image recognition processing". The subject image recognition processing operation in the first exemplary embodiment will be described below with reference to FIG. 4. Further, although the subject image recognition processing is processing about an image of subject's specific part, in a description of the first exemplary embodiment hereafter, it is supposed that this specific part is a face of a person.

FIG. 4 is a flow chart illustrating subject image recognition processing in the first exemplary embodiment. When a fixed time has elapsed since the previous subject image recognition processing, the control processing unit 14 directs starting of the subject image recognition processing to the image processing unit 10. Upon receiving this, first, the subject detection unit 101 detects a facial image of a person of a subject from image data taken from the imaging unit 11 (Step S111). This detection processing is, for example, performed by searching for an area in the image data where shapes and colors of elements (hair, eyes, nose, mouth and so on) of which a face is composed exist in the same positional relationship as an actual face. When a facial image is detected, the subject detection unit 101 outputs position coordinates of the detected facial image in the image data. If a plurality of facial images is included in the image data, the subject detection unit 101 detects all the facial images.

When detection processing of a facial image is completed, the recognition ID assigning unit 102 performs the following processing. First, the recognition ID assigning unit 102 clears detection flags of all subject-recognition-information in the subject-recognition-information table 103. (Step S112). Next, the recognition ID assigning unit 102 extracts one facial image which is among those detected by the subject detection unit 101 and which is not yet processed (Step S113). And the recognition ID assigning unit 102 searches for the subject-recognition-information whose distance from the extracted facial image is within the predefined distance and which has the closest position coordinates in the subject-recognition-information table 103 (Step S114). This processing is, for example, performed by calculating a distance between center coordinates of the extracted facial image and of the subject-recognition-information. Further, the center coordinates of an area which position coordinates {(Xm, Ym), (Xn, Yn)} represent can be calculated by an arithmetic expression of {(Xm+Xn)/2, (Ym+Yn)/2}. As the result of the search, the recognition ID assigning unit 102 judges whether corresponding subject-recognition-information exists or not (Step S115). If it exists, the recognition ID assigning unit 102 updates the position coordinates of the corresponding subject-recognition-information by a value of position coordinates of the extracted facial image and set "Y" to the detection flag (Step S116). If the corresponding subject-recognition-information does not exist, the recognition ID assigning unit 102 assigns a new recognition ID. And this recognition ID, the value of position coordinates of the extracted facial image and the detection flag="Y" are registered additionally to the subject-recognition-information table 103 as new subject-recognition-information (Step S117).

Here, the image processing unit 10 judges whether processing is completed for all facial images detected in Step S111 (Step S118). If not completed, it returns to Step S113 and the same processing is repeated for a facial image which is not processed yet. If completed, the subject image recognition processing ends.

Thus, in the subject image recognition processing, the image processing unit 10 judges subjects whose position coordinates detected this time and position coordinates detected last time are close as identical subjects. By executing such a processing, the camera in the first exemplary embodiment assigns to a plurality of subjects, and to each of them, the identical recognition ID continually without registering subject's characteristic information. By this, a specific subject can be selected and tracked from among a plurality of detected subjects.

Here, a cycle by which the subject image recognition processing is executed does not need to be same as a cycle (frame rate) that the imaging unit 11 generates image data. However, the longer a cycle when processing is executed becomes, the larger subject's movement distance between processing will be. This makes a possibility of a misjudgment high in the above-mentioned method: "to judge subjects whose position coordinates detected this time and position coordinates detected last time are close as identical subjects". Accordingly, it is desirable that a cycle by which the subject image recognition processing is executed is short enough to such an extent that the misjudgment may not occur.

Next, the subject image recognition processing operation in the first exemplary embodiment will be described in time series with reference to FIGS. 5-9.

When the subject image recognition processing ends, the image processing device 10 outputs information about the subject such as the recognition ID. This information is displayed on the monitor screen 12 together with subject's image. FIG. 5 shows a state of the camera 1 just after the subject image recognition processing has ended. FIG. 5(*a*) shows an image which the monitor screen 12 displays. FIG. 5(*b*) shows the contents of the subject-recognition-information table 103. These apply also for FIGS. 6-9.

Three persons 1201-1203 are displayed on the monitor screen 12 of FIG. 5(*a*). Also, frames 1211-1213 which indicate positions where these person's facial images are detected are superposed on the corresponding facial images and displayed. Also, codes 1221-1223 representing recognition IDs ("1"-"3") assigned to the facial images are displayed in the neighborhood of the corresponding facial images. Further, in the following description, the facial image to which the recognition ID "1" is assigned is called "facial image "1"".

The frame 1213 is displayed with different thickness or different color from the other frames so that it can be distinguished from the other frames. This shows that the facial image "3" which the frame 1213 indicates is set as a tracking target. This set-up can be made by a user by performing an operation selecting the facial image "3" during the state that the facial image "3" is detected. The operation is, for example, pushing a corresponding numeric key (key "3") of the key input unit 13, adjusting a cursor (not shown) to the facial image "3" using the cursor keys and so on.

Figure 5B:
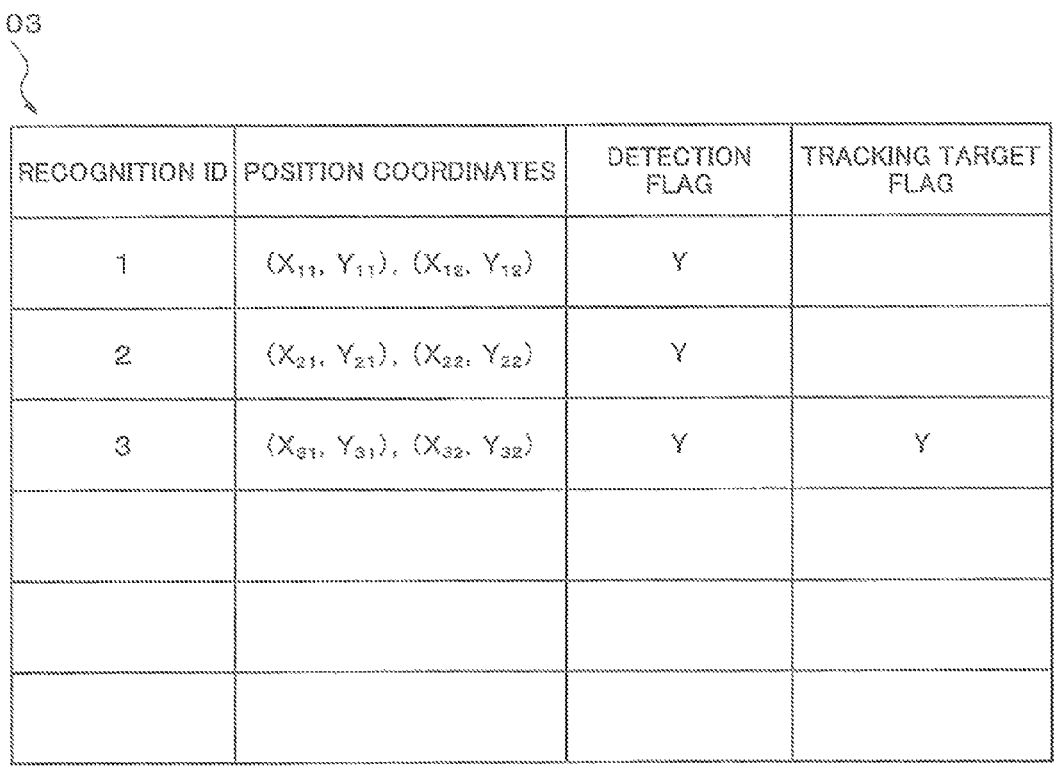
FIG. 5(b) is a figure (part 1) showing the contents of the subject-recognition-information table just after the subject image recognition processing in the first exemplary embodiment.

The subject-recognition-information table 103 of FIG. 5(b) holds the subject-recognition-information about three facial images. Each of the record is set the recognition IDs of "1"-"3" and position coordinates in which a facial image is detected: {(X11, Y11), (X12, Y12)}, {(X21, Y21), (X22, Y22)} and {(X31, Y31), (X32, Y32)}. "Y" is set to the detection flag of all records showing that they are detected. Further, only for the record of the recognition ID "3", "Y" is set to the tracking target flag. This shows that the facial image "3" is set as a tracking target.

FIG. 6 shows a state of the camera 1 just after the subject image recognition processing has been executed and has ended following the moment of FIG. 5.

Referring to FIG. 6(a), two persons 1204 and 1205 detected newly this time are displayed newly. New recognition IDs "4" and "5" are assigned to these facial images, and frames 1214 and 1215 and codes 1224 and 1225 are displayed. Further, if a plurality of facial images is detected newly, recognition IDs may be numbered based on order of the size of a facial image, or a position on the display, for example, order of the distance from the top-left corner.

On the other hand, the person 1202 has moved out of the frame. For this reason, the facial image "2" is not detected. Also, the recognition IDs "1" and "3" same as last time are assigned to the facial images of the persons 1201 and 1203 respectively. This is because, in the subject image recognition processing, the facial images of the persons 1201 and 1203 are linked to the corresponding subject-recognition-information as they are within a short distance from the position coordinates detected last time.

Figure 6B:
FIG. 6(b) is a figure (part 2) showing the contents of the subject-recognition-information table just after the subject image recognition processing in the first exemplary embodiment.

Referring to FIG. 6(b), two records of the subject-recognition-information are added newly. The recognition. IDs of "4" and "5" and the position coordinates where the facial images are detected {(X41, Y41), (X42, Y42)} and {(X51, Y51), (X52, Y52)} are set to these two records. On the other hand, the detection flag is cleared for the subject-recognition-information record of the recognition ID "2" which is concerned with the facial image not detected this time. Further, a value {(X21, Y21), (X22, Y22)} at a time when the facial image "2" was last detected is set to the position coordinates continuously.

FIG. 7 shows a state of the camera 1 just after the subject image recognition processing has been executed and has ended following the moment of FIG. 6.

Referring to FIG. 7(a), the person 1203 is looking back. For this reason, the facial image "3" is not detected. Also the person 1204 has moved to a position which hides the front of the person 1205. For this reason, the facial image "5" is not detected either. Because facial images corresponding to the recognition IDs "2", "3" and "5" are not detected, frames and codes which indicate the facial images "2", "3" and "5" are not displayed.

Figure 7B:
FIG. 7(b) is a figure (part 3) showing the contents of the subject-recognition-information table just after the subject image recognition processing in the first exemplary embodiment.

Referring to FIG. 7(b), the detection flags are cleared for the subject-recognition-information records of the recognition IDs "2", "3" and "5" which are concerned with the facial images not detected this time. Further, values {(X21, Y21), (X22, Y22)}, {(X31, Y31), (X32, Y32)} and {(X51, Y51), (X52, Y52)} at a time when the facial images "2", "3" and "5" were last detected are set to the position coordinates continuously. On the other hand, new position coordinates {(X41', Y41'), (X42', Y42')} which are a movement destination of the facial image are set to the record of the recognition ID "4". Further, {(X41', Y41'), (X42', Y42')} are the position coordinates which are within a distance short enough to the extent that it is judged as a subject identical with the facial image located at {(X41, Y41), (X42, Y42)} last time.

At this moment, the facial image "3" set as a tracking target is not detected. Therefore, at this moment, there are no facial images of tracking target. However, "Y" is set to the tracking target flag of the record of the recognition ID "3" in the subject-recognition-information table 103 continuously.

FIG. 8 shows a state of the camera 1 just after the subject image recognition processing has been executed and has ended following the moment of FIG. 7.

Figure 8A:
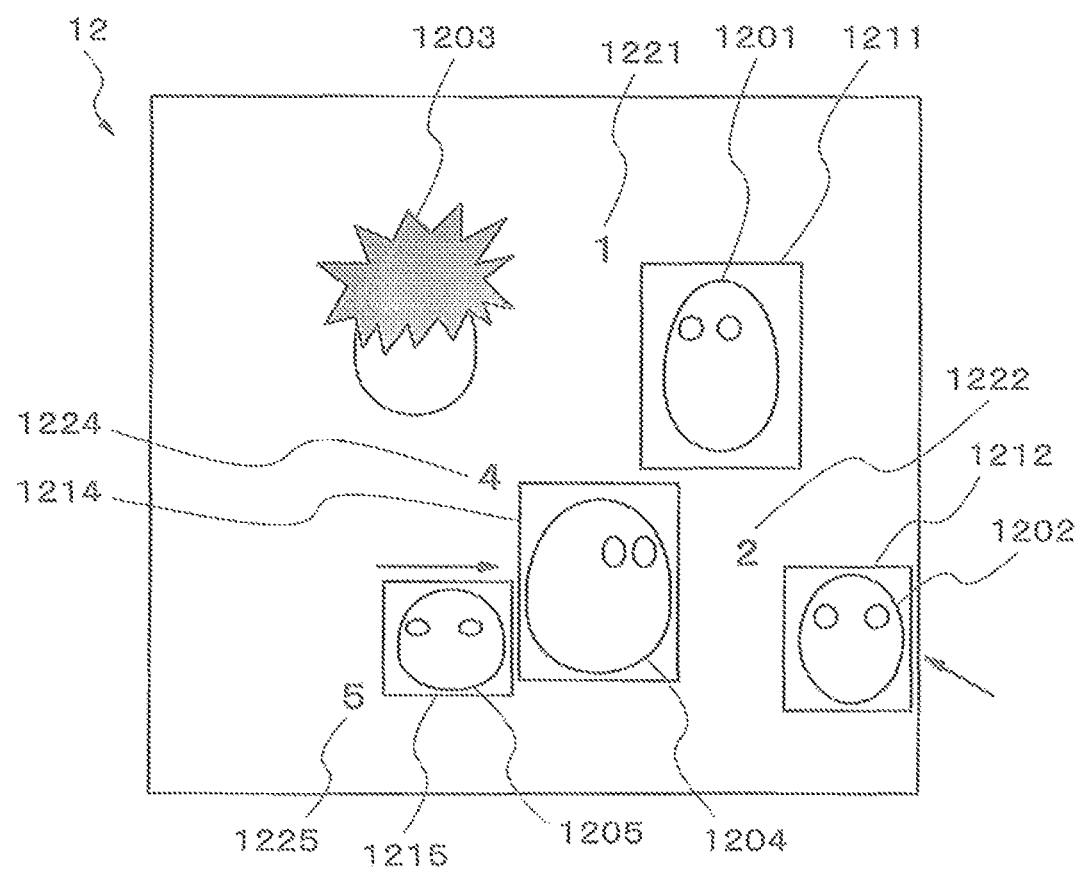
FIG. 8(a) is a figure (part 4) showing an image displayed on the monitor screen just after the subject image recognition processing in the first exemplary embodiment

Referring to FIG. 8(a), the person 1202 has moved into the frame again. Also, the person 1204 has moved once again, and hidden the person 1205 appears once again. For this reason, the facial images of the person 1202 and the person 1205 which were not detected last time are detected. The recognition IDs "2" and "5" same as the time when detected before are assigned to the facial images of persons 1202 and 1205 respectively. This is because, in the subject image recognition processing, the facial images of person 1202 and person 1205 are linked to the corresponding subject-recognition-information as they are within a short distance from the position coordinates last detected. On the other hand, because the person 1203 is still in the state looking back, the facial image "3" is not detected.

Referring to FIG. 8(b), "Y" is set again to the detection flags of the subject-recognition-information records of the recognition IDs "2" and "5" which are concerned with the facial images detected once again this time. Also, new position coordinates {(X21', Y21'), (X22', Y22')} and {(X41", Y41"), (X42", Y42")} which are movement destinations of the facial images are set to the records of the recognition IDs "2" and "4".

At this moment, the facial image "3" set as a tracking target is not detected either. Therefore, at this moment, there are no facial images of tracking target either.

FIG. 9 shows a state of the camera 1 just after the subject image recognition processing has been executed and has ended following the moment of FIG. 8.

Figure 9A:
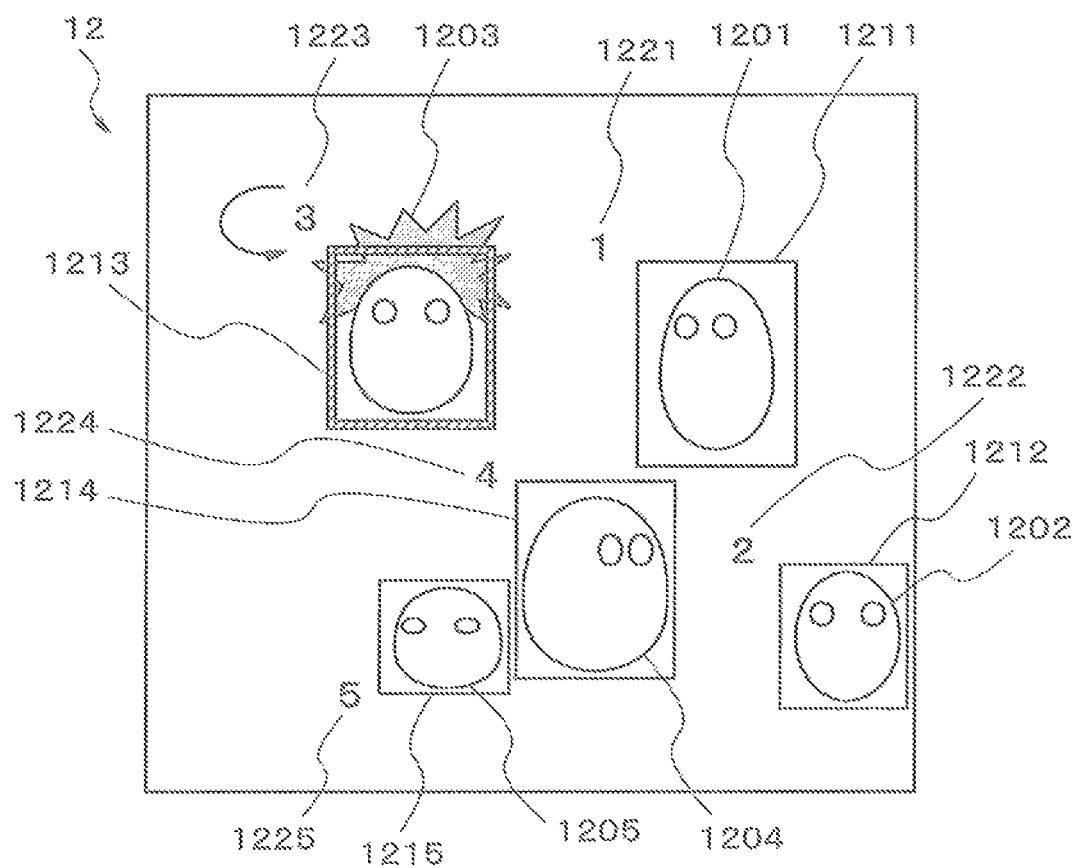
FIG. 9(a) is a figure (part 5) showing an image displayed on the monitor screen just after the subject image recognition processing in the first exemplary embodiment

Referring to FIG. 9(a), the person 1203 is looking forward again. For this reason, the facial image of the person 1203 which was not detected last time is detected. The recognition ID "3" same as the time when detected before is assigned to the facial image of the person 1203. This is because, in the subject image recognition processing, the facial image of the person 1203 is linked to the corresponding subject-recognition-information as it is within a short distance from the position coordinates last detected. Also, same as before the facial image "3" became not detected, the frame 1213 which shows that it is set as a tracking target, and is displayed with different thickness or different color from the other frames, is displayed. This is because, even at a time when the facial image "3" became not detected, "Y" was set to the tracking target flag of the record of the recognition ID "3" in the subject-recognition-information table 103.

Figure 9B:
FIG. 9(b) is a figure (part 5) showing the contents of the subject-recognition-information table just after the subject image recognition processing in the first exemplary embodiment.

Referring to FIG. 9(b), "Y" is set again to the detection flag of the subject-recognition-information record of the recognition ID "3" which is concerned with the facial image detected once again this time. Also, "Y" is set to the tracking target flag continuously.

As has been described above, the camera according to the first exemplary embodiment can, without registering subject's characteristic information and for a plurality of facial images of subjects detected, assign the identical recognition ID to each of them continually. The reason is because the recognition ID assigning unit 102 links the detected facial images and corresponding subject-recognition-information by comparing position coordinates of the detected facial images and position coordinates in the subject-recognition-information table 103.

Also, even when a facial image of a subject becomes not detected temporarily and is detected again after that, the camera according to the first exemplary embodiment can, for a plurality of facial images of subjects detected, assign the identical recognition ID to each of them continually The reason is because, even for the subject which was not detected, the subject-recognition-information table 103 holds position coordinates where the subject was last detected and the recognition ID of the subject.

Also, even when a facial image of a subject which is set as a tracking target becomes not detected temporarily and is detected again after that, the camera according to the first exemplary embodiment can resume tracking automatically. The reason is because, even for the subject which was not detected, the subject-recognition-information table 103 holds the tracking target flag of the subject and the recognition ID of the subject.

Further, the camera according to the first exemplary embodiment can realize data storing and comparison processing by simpler structure compared with the camera disclosed by patent document 1. The reason is because, compared with characteristic information about images of a subject, position coordinates need less data capacities and comparison processing is also simple.

(The Second Exemplary Embodiment)

Next, the second exemplary embodiment of the present invention will be described.

In the first exemplary embodiment of the present invention, when registered once, subject-recognition-information was not deleted after that. However, in the second exemplary embodiment of the present invention, when an image of a subject is not detected for a long time, the point that the corresponding subject-recognition-information is deleted is different from the first exemplary embodiment.

FIG. 10 is a block diagram showing a main functional structure of a camera 1 according to the second exemplary embodiment. Further, in the block diagram of FIG. 10, components which are assigned reference codes identical with ones in the block diagram of FIG. 2 are the same as the components described in FIG. 2. The camera 1 of FIG. 10 includes a subject-recognition-information deletion unit 104 as a new component.

FIG. 11 is a figure showing information stored in a subject-recognition-information table 103 in the second exemplary embodiment. As a new item, a subject-recognition-information table 103 includes a detected time. Further, the other items are same as FIG. 3.

Next, a subject image recognition processing operation in the second exemplary embodiment will be described with reference to FIG. 12.

FIG. 12 is a flow chart illustrating the subject image recognition processing in the second exemplary embodiment. Further, in a flow chart of FIG. 12, steps which are assigned reference codes identical with ones in the flow chart of FIG. 4 are the same as the steps described in FIG. 4. Accordingly, the description about these identical steps is omitted. In FIG. 12, Steps S116 and S117 of FIG. 4 are replaced by Steps S216 and S217 respectively, and Step S219 is added newly.

In Step S216, a recognition ID assigning unit 102 updates the detected time by a value of the current time in addition to updating position coordinates and a detection flag. Also, in Step S217, the recognition ID assigning unit 102 sets a value of the current time to the detected time in addition to setting a recognition ID, the position coordinates and the detection flag. Further, the recognition ID assigning unit 102 may acquire a value of the current time from a built-in clock (not shown) of the camera 1.

Also, when judged in Step S118 that processing has been completed for all facial images, the subject-recognition-information deletion unit 104 extracts all subject-recognition-information for which predefined time has elapsed since the detected time and deletes them (Step S219). This extraction processing is, for example, performed by comparing the current time with a value of the detected time and judging whether the difference of them is greater than a predefined value. After that, the subject image recognition processing ends.

As has been described above, the camera according to the second exemplary embodiment deletes the subject-recognition-information which is not detected for a predefined time. As a result, it can be prevented that the subject-recognition-information which is not detected for a long time is left piling up causing a free space of the subject-recognition-information table 103 to become in short supply and a assigning of a recognition ID to a facial image not to be performed any more.

(The Third Exemplary Embodiment)

Next, the third exemplary embodiment of the present invention will be described.

In the first exemplary embodiment of the present invention, a subject was a face of a person. In the third exemplary embodiment of the present invention, the point that the subject is an image of the person who wears specific clothes is different from the first exemplary embodiment.

Because a functional structure of a camera according to the third exemplary embodiment of the present invention is same as FIGS. 1 and 2, the description will be omitted. Also, because information stored in a subject-recognition-information table 103 is same as FIG. 3 too, the description will be omitted.

Next, a subject image recognition processing operation in the third exemplary embodiment will be described with reference to FIG. 13.

FIG. 13 is a flow chart illustrating the subject image recognition processing in the third exemplary embodiment. Further, in a flow chart of FIG. 13, steps which are assigned reference codes identical with ones in the flow chart of FIG. 4 are the same as the steps described in FIG. 4. Accordingly, the description about these identical steps is omitted. In FIG. 13, Step S111 of FIG. 4 is replaced by Step S311.

When the subject image recognition processing begins, first, a subject detection unit 101 detects an image of a person who wears specific clothes within image data taken from an imaging unit 11. For example, the subject detection unit 101 detects an image of a person who wears a yellow shirt of short sleeves in the upper part of the body and green shorts in the lower part of the body (Step S311). This detection processing is, for example, performed by searching for an area in the image data in which a part with the yellow color and the shape of a shirt of short sleeves and a part with the green color and the shape of shorts exist next to each other. When such an image of clothes is detected, the subject detection unit 101 outputs position coordinates of the detected image of clothes in the image data. When a plurality of such images of clothes is included in the image data, the subject detection unit 101 detects all the images of clothes. Because following processing is same as FIG. 4 except for the point that the subject is the image of clothes, not the facial image, the description will be omitted.

Next, a state of the camera 1 just after the subject image recognition processing in the third exemplary embodiment has ended will be described with reference to FIG. 14. FIG. 14(a) shows an image of a monitor screen 12 and FIG. 14(b) shows the contents of the subject-recognition-information table 103 respectively. Also, in the following description, it is supposed that the subject detection unit 101 detects an image of a person who wears a yellow shirt of short sleeves in the upper part of the body and green shorts in the lower part of the body.

Figure 14A:
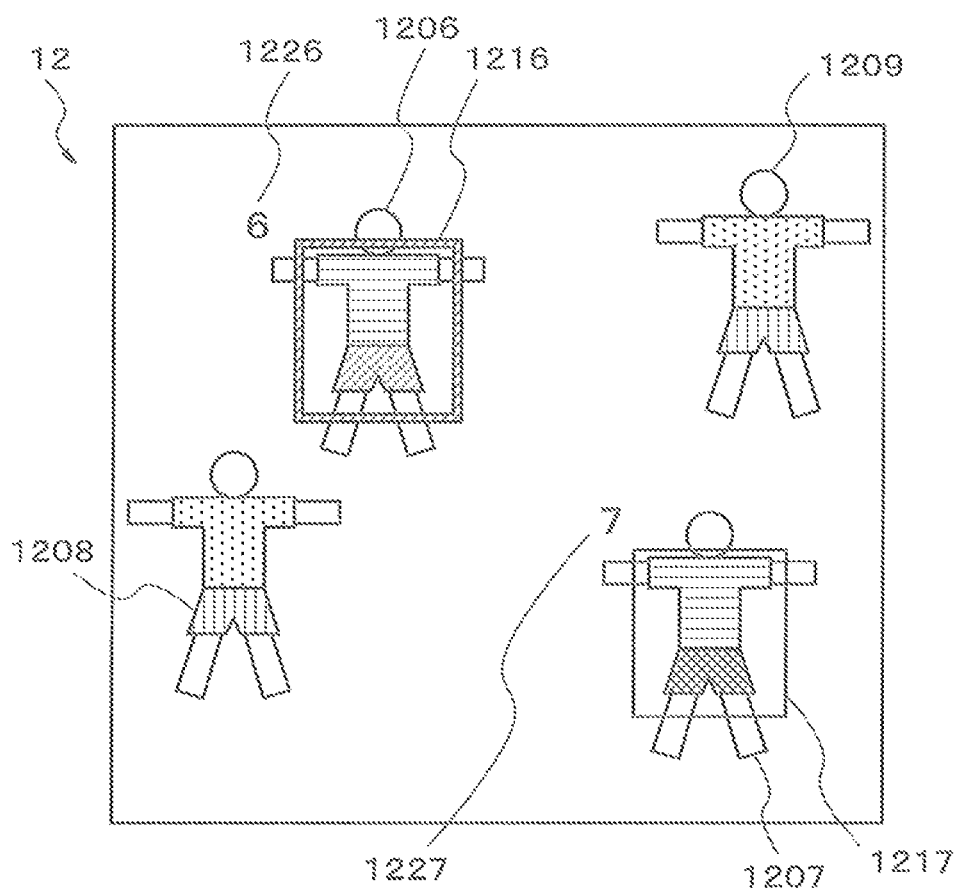
FIG. 14(a) is a figure showing an image displayed on a monitor screen just after the subject image recognition processing in the third exemplary embodiment.

Four persons 1206-1209 are displayed on the monitor screen 12 of FIG. 14(a). Among these, the persons 1206 and 1207 wear a yellow shirt of short sleeves in the upper part of the body and green shorts in the lower part of the body. On the other hand, the persons 1208 and 1209 wear clothes different from them (for example, blue shirt of short sleeves and white shorts).

The subject detection unit 101 detects images of clothes of the persons 1206 and 1207. Frames 1216 and 1217 which indicate positions in which these images of clothes are detected and codes 1226 and 1227 representing recognition IDs ("6", "7") assigned to the images of clothes are displayed on the monitor screen 12.

The subject-recognition-information table 103 of FIG. 14(b) holds subject-recognition-information about two detected images of clothes.

As has been described above, the camera according to the third exemplary embodiment applies the function of the camera of the first exemplary embodiment to a specific image of clothes of a person, not a facial image of the person. As a result, when photographing at a sports competition, for example, only persons who wear uniforms of a specific team can be detected, and tracked.

Also, the function of the camera of the first exemplary embodiment may be applied to a specific animal such as a cat or a dog, a specific vehicle such as a car or an airplane, or further, a subject which has a specific characteristic in its shape or color.

As stated above, exemplary embodiments of the present invention have been described taking a camera which assigns a recognition ID to a subject as an example. However, an image processing device according to the present invention can also be applied to camera function which is included in a cellular phone or a PDA (Personal Digital Assistant) and so on. Also, the image processing device according to the present invention can be applied to a camera having a function of taking motion pictures too. Also, the image processing device according to the present invention can be applied to an image analyzing device, for example, which analyzes a recorded image and which does not have an imaging means, too.

While the present invention has been described with reference to exemplary embodiments thereof, the present invention is not limited to these embodiments. It will be understood by those of ordinary skill in the art that various changes in form and details may be made therein without departing from the spirit and scope of the present invention.

The invention claimed is:

1. An image processing device, comprising:
   a subject detection unit that detects a subject image from an image;
   a subject-recognition-information storage unit that stores a recognition ID of said subject image, a detection flag which shows whether said subject image is detected, and a first position that is the position at which said subject image was last detected within said image; and
   a recognition ID assigning unit that assigns the recognition ID to said subject image, wherein
   if said first position is within a predefined distance from the position at which said subject detection unit detected said subject image, said recognition ID assigning unit assigns the recognition ID corresponding to said first position to said subject image and sets a value, which indicates that said subject image is detected, to said detection flag, and a frame is superposed on said subject image and displayed when said detection flag indicates that said subject image is detected.

2. The image processing device according to claim 1, wherein said recognition ID assigning unit assigns the new recognition ID to said subject image and sets a value, which indicates that said subject image is detected, to said detection flag if said first position is not within the predefined distance from the position at which said subject detection unit detected said subject image.

3. The image processing device according to claim 1, wherein
   said subject-recognition-information storage unit stores a first time which is time when said subject image was last detected; and
   the image processing device further comprising a subject-recognition-information deletion unit which deletes said first time, said recognition ID and said first position corresponding to said first time from said subject-recognition-information storage unit when a predefined time has elapsed since said first time.

4. The image processing device according to claim 1, wherein said subject image is a facial image of a person.

5. The image processing device according to claim 1, wherein said subject image is an image of specific clothes of a person.

6. A camera, comprising:
   an imaging unit for photographing a subject;
   the image processing device according to claim 1; and
   a display device which displays an image which said imaging unit photographs and information about said subject which said image processing device generates.

7. An image processing method, comprising:
   storing a recognition ID of a subject image, a detection flag which shows whether said subject image is detected, and a first position that is the position at which said subject image was last detected within an image;
   detecting said subject image from said image; and
   assigning the recognition ID corresponding to said first position to said subject image if said first position is within a predefined distance from the position at which said subject image was detected and sets a value, which indicates that said subject image is detected, to said detection flag,
   wherein a frame is superposed on said subject image and displayed when said detection flag indicates that said subject image is detected.

8. The image processing method according to claim 7, wherein the new recognition ID is assigned to said subject image and sets a value, which indicates that said subject image is detected, to said detection flag if said first position is not within the predefined distance from the position at which said subject image was detected.

9. The image processing method according to claim 7, comprising:
   storing a first time which is time said subject image was last detected; and
   deleting said first time and said recognition ID and said first position corresponding to said first time when a predefined time has elapsed since said first time.

10. The image processing method according to claim 7, wherein said subject image is a facial image of a person.

11. The image processing method according to claim 7, wherein said subject image is an image of specific clothes of a person.

* * * * *